United States Patent [19]

Izard

[11] Patent Number: 4,474,720
[45] Date of Patent: Oct. 2, 1984

[54] METHOD OF MAKING PATTERN MATRIX HAVING UNIFORM BACKER THICKNESS

[75] Inventor: David G. Izard, Wauconda, Ill.

[73] Assignee: United States Gypsum Company, Chicago, Ill.

[21] Appl. No.: 462,672

[22] Filed: Jan. 31, 1983

[51] Int. Cl.³ .............................................. B29C 1/02
[52] U.S. Cl. .................................. 264/156; 264/225; 264/258; 428/131
[58] Field of Search ...................... 156/245, 242, 246; 264/225, 227, 226, 154, 155, 156, 257, 258, 261, 277, 275, 279.1, 278; 428/131, 137; 29/121.1, 121.3; 425/83.1, 84, 85; 249/187 R, 203; 162/116, 117

[56] References Cited

U.S. PATENT DOCUMENTS

| | | | |
|---|---|---|---|
| 2,221,200 | 11/1940 | Perry | 162/116 |
| 3,121,660 | 2/1964 | Hall, Jr. | 428/131 |
| 3,562,863 | 2/1971 | Kobayashi | 29/121.3 |
| 3,594,244 | 7/1971 | Mackinnon et al. | 264/225 |
| 3,720,578 | 3/1973 | Heling et al. | 162/116 |
| 3,773,879 | 11/1973 | Munsil et al. | 264/225 |
| 4,229,400 | 10/1980 | Laurie | 264/225 |

Primary Examiner—Michael W. Ball
Attorney, Agent, or Firm—Robert M. Didrick; Samuel Kurlandsky; Robert H. Robinson

[57] ABSTRACT

A tough, flexible, sheet-like matrix for a bas-relief pattern is made by casting a reinforced resin on a mold of the pattern and submerging a perforated plate in the liquid resin so that the plate is parallel to a substantially flat plane generated by the lowest points of the pattern. The matrix, exclusive of the peaks and valleys of the pattern, has a uniform thickness and has a multitude of studs integral with and dependent from the sheet. A porous matrix is useful for the wet-end texturing of fiberboard at the final suction press roll of a Fourdrinier fiberboard machine.

7 Claims, 5 Drawing Figures

METHOD OF MAKING PATTERN MATRIX HAVING UNIFORM BACKER THICKNESS

This application relates to a method for producing wetfelted fiberboard having a textured surface. It relates more particularly to a method and apparatus for creating a textured surface on the fiberboard before the mat is fully de-watered. It relates still more particularly to a porous matrix for the texture pattern, to a method for making said matrix, and to a method for manufacturing such fiberboard by means of such porous matrix.

The production of fiberboard on a Fourdrinier machine or Oliver cylinder machine is well known. Such machines are described in U.S. Pat. No. 3,391,013 (Re. 27,109) and in U.S. Pat. No. 3,511,744, respectively. Other descriptions are abundantly available.

Generally, the fiberboard is processed further to form acoustical ceiling tiles or panels, wall panels, and the like. It is often desirable to impart a pleasing texture to such products for esthetic reasons, and, to some extent, for improved acoustical properties.

Methods known for imparting a texture include the patterned sandblasting of the dried fiberboard, rough screeding of the partially de-watered slurry of fibers, and pressing of the wet mat under a solid press roll having the reverse of the desired pattern in the metal. The sandblasting procedure must be very carefully controlled and it is wasteful of the eroded material. The screeding procedure is limited as to the number of distinctive patterns that can be formed. The solid press rolls do not achieve high fidelity in the reproduction of the pattern.

In more recent versions of the Fourdrinier machine for making fiberboard, the removal of water from the thin slurry of fibers is accomplished not only by free drainage through the felting wire near the headbox and by vacuum during passage over the suction boxes but also by vacuum as the slurry passes under a series of suction press rolls mounted above the bottom wire and mated with a series of rolls which contact the bottom wire. The top suction press rolls are perforated cylinders, each having a vacuum slice which is stationary but mounted within the perforated cylinder in slidable contact with the inner wall. The top wire of the Fourdrinier forms a continuous loop around the set of suction rolls. Usually, these suction rolls are used only to consolidate the slurry and smooth its surface. Attempts have been made, however, to use the final suction roll to impress a texture pattern on the still very wet fibrous mass. Such attempts have had limited success. Wrapping the final suction roll with a felting wire having the pattern formed thereon is impractical because the wire soon stretches during use so that kinks are formed and, eventually, the wire can no longer be held in place on the roll. Replacement of the felting wire with a sheet of another material as the pattern-bearing medium must take into account the fact that, in order to function on the suction roll, the sheet must have a sufficient number of holes in alignment with the perforations in the cylinder wall to establish effective communication between the vacuum slice and the fibrous slurry. Because the number of holes must be limited in order to prevent excessive weakening of the sheet, the random scattering of a multitude of holes in order to assure sufficient communication is not favored. Thus, until the present invention, careful alignment of the holes in the pattern sheet with the perforations in the suction roll would have been the costly solution.

Moreover, the area to be covered by a pattern matrix affixed to a typical suction press roll is about 100 square feet, the cylindrical roll being 12.5 feet long and having a diameter of about 2.5 feet. The transferral of the designer's pattern to a sheet-like matrix large enough to encircle such a cylinder is not a simple task for a patternmaker, who traditionally casts the mold between two plates both of which must be carefully prepared and checked to certify that each is a true plate, a truly flat plate. The bottom plate or table is often a massive piece of highly polished granite. An upper plate large enough and rigid enough to serve as a true plate for a 100 square foot casting would be much too heavy for practical use.

The invention described and claimed herein eliminates the need for either of the true plates of the patternmaker's art.

It is therefore, an object of this invention to provide a porous matrix for a fiberboard pattern, which matrix when mounted on a suction press roll provides lateral air and water passages which connect the holes in the matrix with the perforations in the press roll.

It is another object of this invention to provide a pattern matrix having a laminated base of uniform thickness.

It is another object of this invention to provide a porous matrix which is adapted for placement on a suction press roll.

It is another object of this invention to provide a method for making a porous matrix bearing a pattern for texturing fiberboard.

It is yet another object of this invention to provide a method for casting a sharply defined pattern in a matrix even though the supporting surface for the pattern mold and the mold itself are not perfectly level.

It is a still further object of this invention to provide a method for texturing a fiberboard surface at the wet end of the fiberboard manufacturing process.

It is still another object of this invention to provide a matrix and a method for repeatably reproducing a texture on fiberboard with high fidelity to the designer's pattern.

In accordance with these objects, one aspect of this invention is a method for making a pattern embossing matrix for a bas-relief pattern, said method comprising generating a pattern whose lowest points lie in a substantially flat plane, casting a female mold of said pattern, thereby causing the highest points of the mold to lie in the same substantially flat plane, casting a liquid resin onto the mold, submerging a perforated plate in said resin to a plane spaced apart from but parallel to said substantially flat plane, curing said resin, shaving excess resin from the face of said plate, lifting said plate from the cured resin, and removing the resulting matrix from the mold.

Piercing the matrix with a punch or a drill bit to form a plurality of holes prepares the matrix for use in the wetend texturing of fiberboard under a suction press roll. The shaving off of resin protruding through the perforations of the plate creates a multitude of studs on the bottom side of the pattern matrix. Because of the plate's placement in said flat plane, the ends of the studs are substantially equidistant from the sheet-like matrix.

For the purposes of this invention, a substantially flat plane is one that diverges no more than about 1 inch from the true horizontal as the plane traverses a 12 foot expanse. A very slight, gradual curvature is permissible.

The invention, in its various aspects, will be understood more clearly by reference to the accompanying drawings, a brief description thereof, and a detailed discussion of the invention as a whole.

Figure 1:
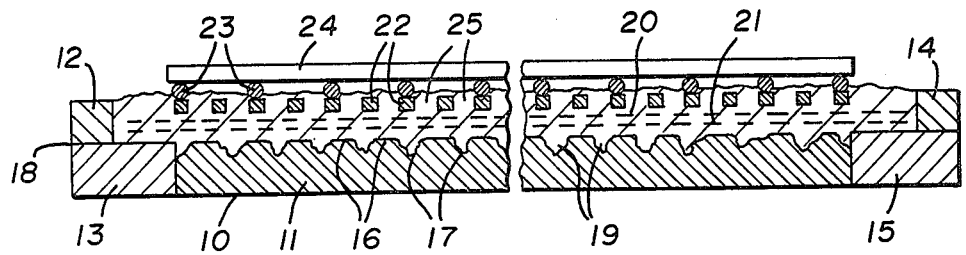
FIG. 1 is a cross section of the matrix as it is being cast from a female mold of the pattern.

IN FIG. 1, the female mold 10 of the pattern has a body portion 11 and side rails 12, 13, 14, and 15. The body portion 11 is characterized by ridges 16 and valleys 17, the highest of the ridges 16 all lying in the same horizontal plane 18. Liquid resin 19 lies in the valleys 17 and over the ridges 16. Layers 20 and 21 of glass fiber fabric are immersed in the resin 19 and a perforated metal plate 22 is submerged in said resin. The plane in which the plate 22 lies is parallel to the horizontal plane 18. A grid of steel bars 23 and steel rods 24 rests upon the plate 22 between the perforations 25 and supports a uniformly distributed load of from about 0.5 p.s.i. to about 1.5 p.s.i.

Figure 2:
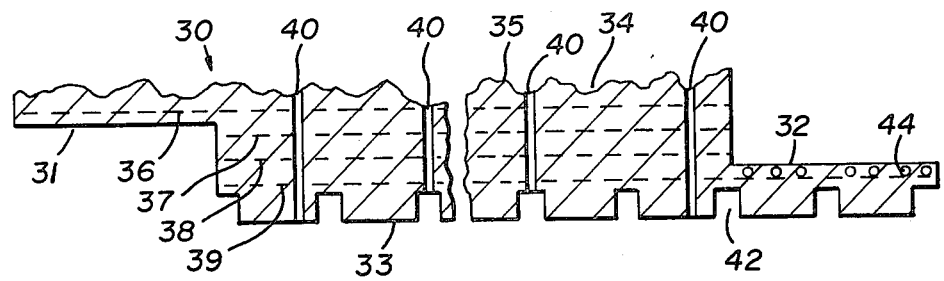
FIG. 2 is a cross section of another embodiment of the matrix of this invention.

In FIG. 2, the matrix 30 has a bottom shiplap 31 and a top shiplap 32 so that when the matrix is wrapped around a suction press roll the longitudinally opposite ends overlap and may be joined by a resin-saturated strip of glass fiber fabric of appropriate thickness or by some other suitable means. The studs 33 are the portions of resin which project through the perforations 25 of the plate 22 in FIG. 1. The notches 34 and the peaks 35 are the male counterparts of the ridges and valleys of the female mold. There are four layers 36, 37, 38, and 39 of glass fabric laminated with the resin in the matrix 30. A plurality of holes 40 have been pierced in the matrix 30 to serve in conjunction with the channels 42 between the studs 33 as passageways for water and air sucked out of the fibrous slurry when the matrix 30 is mounted on a suction press roll and put into use for wetend texturing of fiberboard.

Casting of the pattern matrix of this invention is accomplished preferably by covering the ridges 16 with a resin and allowing it to cure partially to the state at which it will hold a peak. A layer of glass fabric or other reinforcing fiber is then laid on the resin and additional liquid resin is added to saturate the fabric. Lamination is continued until the desired thickness is achieved, the final layer being resin. A perforated plate 22, having a thickness of about 50 mils, is laid on the surface of the liquid resin and is weighted down by placing a grid of uniformly spaced-apart bars 23 and rods 24 on the plate 22 so that a uniformly distributed load of from about 0.5 to about 1.5 pounds per square inch bears down on the plate. If necessary, several 5 gallon pails of water or a water-filled bladder such as a water mattress may be set on the grid to attain the proper load. When the resin has cured, the load is removed and excess resin is shaved away from the surface of the plate. The plate is lifted away from the laminated matrix sheet and the matrix sheet is removed from the female mold 10. A multitude of studs 33, dependent from the sheet, are thus created by the perforated plate 22. The uniform load distribution causes the plate to rest parallel to the plane 18 and, in turn, causes the studs 33 to be of uniform thickness. Typically, the variation in the distance between the distal ends of the studs and the sheet from which they depend is no more than ±2 mils. The overall thickness of the matrix sheet, inclusive of the stud but not of the pattern, is about 100 mils. About 50% of the area of the bottom, or press roll side, of the matrix sheet is occupied by the studs. There may be from about 100 to about 2000 studs per square foot of the matrix sheet, depending upon the size and shape of the studs.

Figure 5:
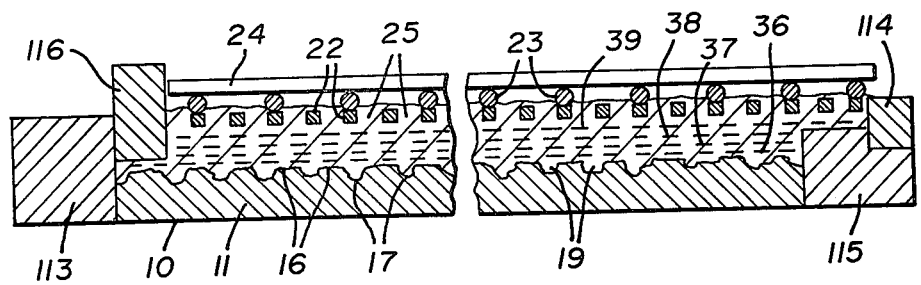
FIG. 5 is a cross section of the matrix of FIG. 2 as it is being cast from a female mold of the pattern.

The formation of the shiplaps 31 and 32 of the matrix 30 (FIG. 2) is accomplished in much the same fashion as described above with reference to FIG. 1 but the side rails 12, 13, 14 and 15 are replaced by side rails 113, 114, 115 and a shim 116, as shown in FIG. 5. After the first layer of resin and the fiber glass layer 36 have been placed on the mold 10, the shim 116 is put into place and layers 37, 38, and 39 of fiber glass fabric are alternated with resin until the desired thickness is obtained. The plate 22 and the bars 23 and rods 24 are placed as shown. The side rails 113, 114, and 115, like rails 12, 13, 14 and 15 in FIG. 1, form two walls of a dam around the mold 10; two other walls are, of course, needed to complete the dam but their placement is deemed to be well within the skill of the art and are not shown.

The casting resin may be, for example, an epoxy, a polyurethane, or a polyester. A two-part epoxy resin having a very low viscosity before curing is preferred so that the highly detailed patterns on the female mold may be reproduced faithfully. The preferred resin is one that has a long open time and, when cured, is flexible, tough, and has a high impact strength.

Figure 3:
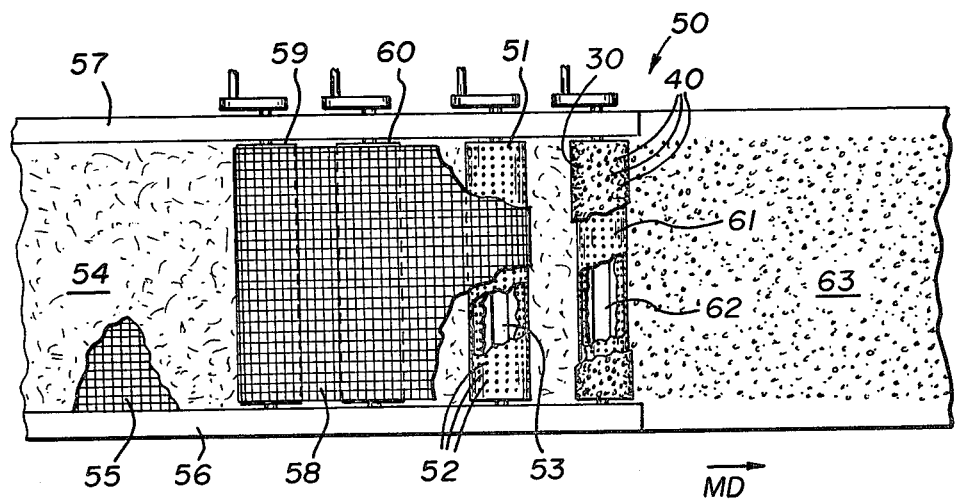
FIG. 3 is a plan view, partially cut away, of the suction press roll section of a fiberboard machine showing the pattern matrix in place.

In FIG. 3, the machine direction of the fiberboard machine 50 is shown by the arrow MD. The penultimate suction press roll 51 has a multitude of perforations 52 around its circumference and a vacuum slice 53 in position at the nip between the roll 51 and the fibrous slurry 54 which is contained on the bottom Fourdrinier screen 55 by the side rails 56 and 57. A top screen 58 is looped around the roll 51 and the suction press rolls 59 and 60 which precede it so that the screen 58 is in contact with the slurry 54. The rolls 51, 59, and 60 are driven by conventional power train means not shown. Conventional vacuum line connections are also used but not shown.

The texturing press roll 61 is a perforated cylinder, also, and it has a vacuum slice 62 which is slidably mounted within the roll so that the vacuum is always available at the nip between the roll 61 and the slurry 54. The matrix, with or without the shiplaps, may be applied to the press roll 61 by coating the ends of the studs 33 with an adhesive, being careful not to close the holes 40, cradling the matrix in a sheet-like stretcher, wrapping the matrix and stretcher around the roll and drawing the stretcher ends together to close the seam between the opposite ends of the matrix. When the shiplaps 31 and 32 are cast into the matrix, the overlapping portions are joined by a curable resin-saturated strip of glass fabric or by a layer of a hot melt adhesive. The shiplap 32 may have heating wires 44 embedded therein so that when an electric current is passed through them, a hot melt adhesive melts for easy attachment or detachment of the matrix from the roll.

The holes 40 in the matrix 30 communicate with the vacuum slice 62 either directly if they happen to be aligned with a perforation in the roll 61 or through channels 42 afforded by the spaces between the studs 33. By this means, water in the slurry 54 is drawn out of the slurry through the holes 40, around the studs 33, through the perforated cylinder of the roll 61 and into the vacuum slice 62. At the same time, the solids in the slurry 54 are compacted against the pattern of the matrix by a combination of the pressure exerted by the weight of the roll 61 and the atmospheric pressure working against the partial vacuum within the slice 62. A texture having high fidelity to the original pattern is thus imparted to the fiberboard mat 63 while it is still quite wet. After texturing, the mat is cut to the desired dimensions and dried in a kiln according to conventional practices.

The fiberboard preferably is made from an aqueous slurry of mineral fibers such as, for example, those made by the fiberization of molten rock or blast furnace slag. For a lightweight fiberboard, it is preferable that the slurry also contain expanded perlite (2-4 lbs./cu. ft.) and a cellulosic gel such as that described in U.S. Pat. No. 3,379,609. Expanded perlite is a preferred component of the slurry because it also imparts better packing properties to the slurry and thus improves the conformability of the mat to the pattern.

As it emerges from the headbox, the slurry is made up of about 95% water and 5% solids. Free draining and forced draining over the suction boxes of the Fourdrinier machine lowers the water content to about 80% when the slurry reaches the suction press section. As the slurry arrives at the texturing press roll 61, the solids content is typically from about 20% to about 25% by weight, but it may range from about 10% to about 35%. As it leaves from under the roll 61, the textured mat has a solids content ranging from about 30% to about 40% by weight.

The roll pressure in the suction press roll section is about 20 p.s.i. The pressure in the vacuum slices is about 10 p.s.i.

Figure 4:
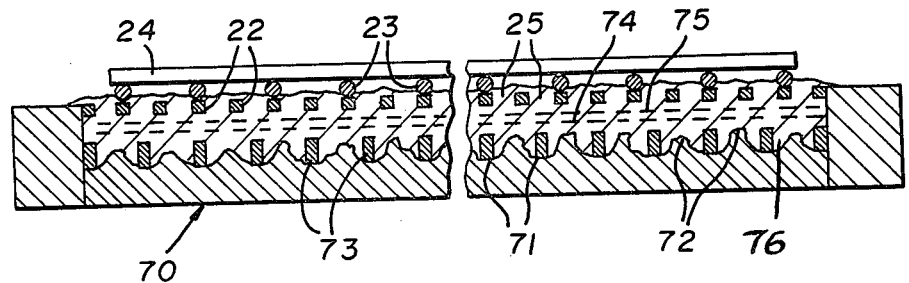
FIG. 4 is a cross section of a master pattern matrix as it is being cast by a modified method of this invention.

In FIG. 4, a positive or male mold 70 of the pattern has its lowest points 71 lying in a substantially flat plane while its peaks 72 are of irregular and random height. The mold 70 may be tooled from a metal, plastic or any suitable material. The spacers 73, likewise of metal, plastic or the like, are of uniform height and function as thickness control spacers in that they support the layers 74 and 75 of glass fabric in a plane which, for all practical purposes, is parallel to the plane in which the points 71 lie. A curable liquid resin 76 surrounds the spacers 73 and saturates the glass fabric layers 74 and 75. A layer of the resin 76 lies above the fabric layer 75 and a perforated plate 22 is submerged in the resin 76 and held in a plane parallel to the plane in which points 71 lie by a grid of steel bars 23 and steel rods 24 which uniformly distribute a load of from about 0.5 to about 1.5 pounds per square inch over the area of the plate 22. The top layer of resin 76 rises through the perforations 25.

Again, as in the casting method associated with the mold of FIG. 1, the first layer of resin is partially cured before the first layer 74 of glass fabric is placed above the spacers 73. When the whole body of resin has been cured, the excess is shaved from the surface of the plate 22, the plate is removed from the matrix, and the matrix is lifted from the positive mold 70. The spacers 73, unlike all of the other molding implements used in this invention, are not coated with a mold release agent and, therefore, remain as a part of the cast matrix. In this manner, a master female matrix of a size sufficient for the casting of a press roll matrix may be cast from an array of smaller positive molds set side-by-side in a suitable frame. The weight of such a master matrix, despite its size, is small so that the matrix is moved about easily when rolled up.

It is contemplated that various modifications of the invention thus described and illustrated may be made while remaining within the scope of the appended claims.

Therefore, I claim:

1. A method for making a pattern embossing matrix, said method comprising generating a bas-relief pattern whose lowest points lie in a substantially flat plane, casting a female mold of said pattern, casting a liquid resin onto the mold, placing a perforated plate on the surface of said resin, submerging said plate in said resin to a plane spaced apart from but parallel to said substantially flat plane, curing said resin, shaving excess resin from the face of said plate, removing said plate from the cured resin, and removing the resulting matrix from the mold and piercing the cured matrix to form a plurality of holes therein.

2. The method of claim 1 wherein one or more layers of a reinforcing fiber are alternated with layers of the resin before the perforated plate is placed on the surface of the final layer of resin.

3. The method of claim 2 wherein the first layer of liquid resin is cured partially to a stage at which it will hold a peak before the first layer of reinforcing fiber is placed on the mold.

4. The method of claim 1 wherein a uniformly distributed load of from about 0.5 to about 1.5 pounds per square inch is placed on the perforated plate.

5. A method for making a pattern-bearing matrix, said method comprising generating a bas-relief pattern having peaks and valleys and whose lowest points lie in a substantially flat plane, placing spacers of uniform length on said lowest points, said length being at least equal to the distance between the lowest point and the highest peak, casting a liquid resin onto said pattern, submerging a perforated plate in said resin to a plane spaced apart from but parallel to said substantially flat plane, curing said resin, shaving excess resin from the face of said plate, removing said plate from the cured resin and removing the resulting matrix and piercing the cured matrix to form a plurality of holes therein.

6. The method of claim 5 wherein a first layer of the liquid resin is cured partially to a stage at which it will hold a peak and a layer of a reinforcing fiber is laid on the partially cured resin.

7. The method of claim 6 wherein succeeding, alternating layers of liquid resin and reinforcing fibers are placed on the partially cured resin and the perforated plate is submerged in the final layer of liquid resin.

* * * * *